June 4, 1968 C. L. G. BENARD 3,387,128
RADIATION CONDENSER DEVICES
Filed Feb. 15, 1965 2 Sheets-Sheet 1
Fig.1.
PRIOR ART
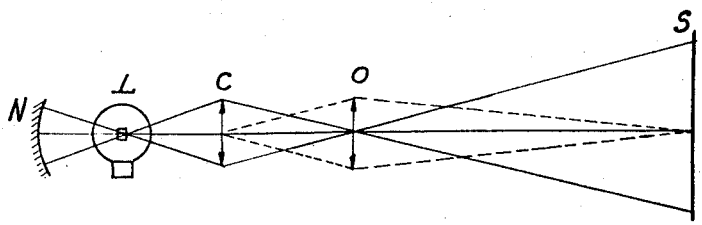
Fig.2.
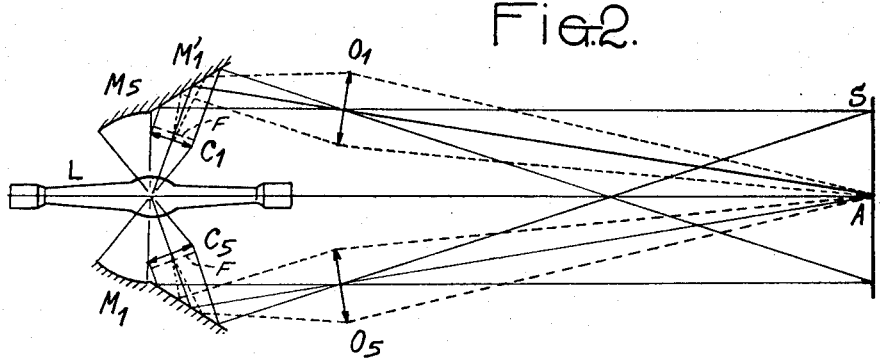
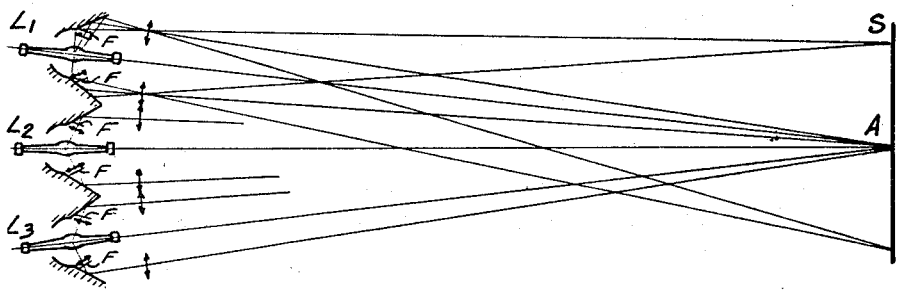
Fig.3.
Inventor
Christian Louis Georges Benard
By
Karl W. Flocks
Attorney

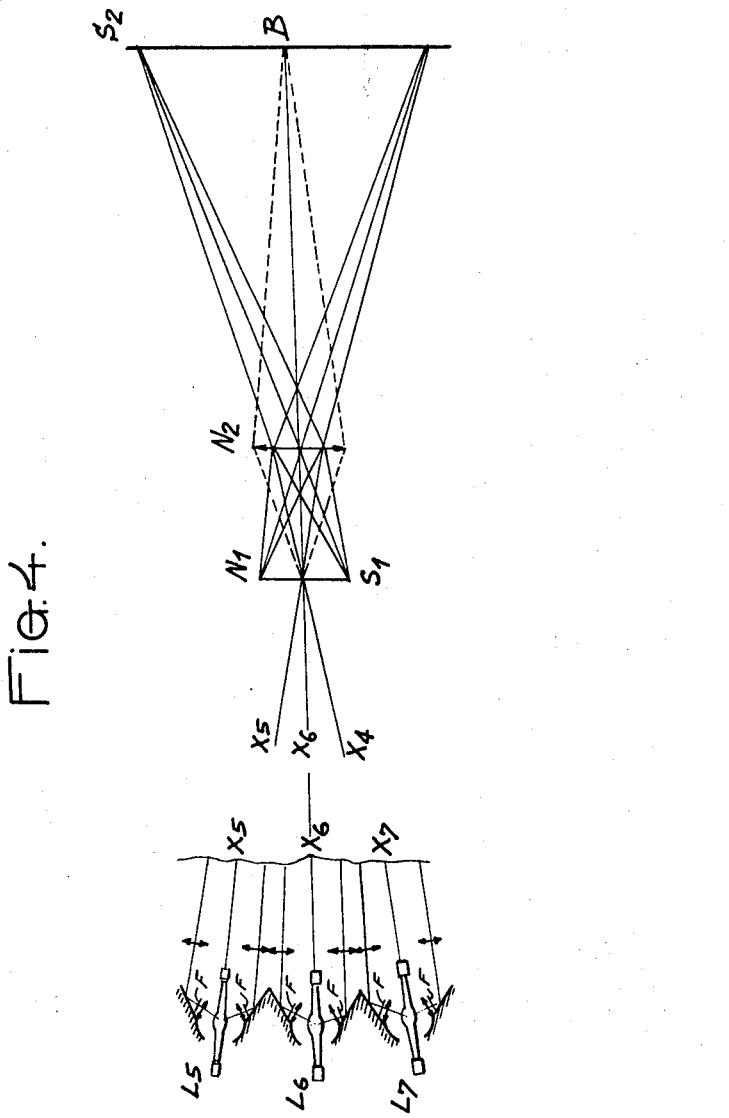

United States Patent Office 3,387,128
Patented June 4, 1968

3,387,128
RADIATION CONDENSER DEVICES
Christian Louis Georges Benard, Paris, France, assignor to Anciens Etablissements Barbier, Benard & Turenne, Paris, France, a joint-stock company of France
Filed Feb. 15, 1965, Ser. No. 432,698
Claims priority, application France, Feb. 18, 1964, 964,243
10 Claims. (Cl. 240—41.3)

ABSTRACT OF THE DISCLOSURE

Radiation condenser device enabling irradiated surfaces to be lighted uniformly, for instance intended for spatial simulation, comprising several elementary condenser devices comprising a source of light, a spherical mirror, one or two condenser lenses and an objective lens. All the images of the elementary devices coincide so that the irradiated surface is uniformly lighted. Filters may be disposed on the course of each elementary pencil, thus providing light the spectral partition of which is controlled at will.

---

This invention relates to improved radiation condenser devices which enable irradiated surfaces to be lighted uniformly.

An elementary system of radiation condenser for uniform illumination is known which consists of a source of light, possibly a spherical mirror centered on the source and placed behind it, thus enabling part of the flux which is usually lost to be utilized, a condenser lens, and an objective lens which is in turn placed on the image from the source passing through the said condenser lens and forming the image of the said condenser on the irradiated surface.

This condenser system is inconvenient in that the uniformity of the illumination thus obtained theoretically is the less effective as the aperture angle of the condenser is greater, and for this reason only condensers with small apertures are used and therefore only a small part of the flux emitted by the source is caught, even when a spherical mirror is placed behind the latter.

Another inconvenience of this condenser system is that, because it comprises a single pencil, it does not allow for a flexible correction of the spectral composition of the radiating pencil, particularly when various corrector filters are placed in the path of the said pencil, as these filters sometimes have opposing properties which make it impossible to utilize them on a single pencil and to obtain a pencil of light having a clearly defined spectral composition in a precise and flexible manner.

It is the purpose of this invention to eliminate the abovementioned drawbacks and to use a very much greater part of the flux emitted by the source, while obtaining a uniform degree of illumination and allowing flexible and precise correction of the spectral composition of the irradiating pencil and the obtainment of pencils having a clearly defined spectral composition.

The present invention is characterised by the combination of several elementary systems, giving a uniform illumination, each catching a part of the flux emitted by the source and reconcentrating the individual elementary irradiating pencils thus formed onto the surface to be irradiated in such a manner that all the elementary pencils coincide exactly on the latter, or its vicinity.

It is possible, if desired, to correct certain of the elementary pencils by adding suitable corrector filters, thus modifying in a very flexible manner the spectral composition of the flux irradiating the surface.

It is also possible to group the said elementary systems around several sources of radiation by reconcentrating all the elementary pencils thus formed onto the surface to be irradiated in such a way that the said elementary pencils coincide exactly on the latter, or in its vicinity.

By combining selected emitting lamps and the spectral correction of certain elementary pencils it is possible to obtain, in a very flexible manner and with great precision, a radiating pencil with a well defined spectral composition.

The present invention will be better understood from the description which follows with reference to the accompanying drawings in which:

FIGURE 1 is a cross section of a known elementary condenser system with uniform illumination, forming the basis of combinations in accordance with the invention.

FIGURE 2 is a cross section of a first form of embodiment of the invention using a single source of flux and eight elementary optical systems.

FIGURE 3 is a cross section of a second form of embodiment of the invention using several sources of flux.

FIGURE 4 is a cross section of a third form of embodiment of the invention allowing the radiating pencil to pass through a small dimensional section.

FIGURE 1 shows the known elementary system consisting of a source of light L, a spherical mirror M centered on the source or adjacent to it, and placed behind it, a condenser lens C with a small aperture angle to obtain uniform illumination and illuminated uniformly by the source L, and an objective lens O placed on the image of the source through the said condenser C or in an adjoining plane, the lens O forming an image of the condenser C or that of an adjoining plane on the surface to be irradiated S, or in its proximity.

In the form of embodiment of the invention shown in FIGURE 2, the improved condenser device has a source of light L with a short arc discharge, around which are uniformly placed eight identical elementary systems of the type described in the preceding paragraph, with their optical axes passing through the center of source L and the center A of the surface S to be irradiated, each of the said elementary systems also comprises a plane mirror suitably inclined and placed in the path of the elementary flux between the condenser and the objective lens in such a way that all the images from the said condensers passing through the objective lens coincide with one another exactly on the surface to be irradiated S.

The said condenser device comprises a source of light $L_1$, a ring of eight condenser lenses $C_1, C_2 \ldots C_8$ with a half aperture angle of about 20°, catching a total of about 25% of the flux emitted by the source, symmetrically arranged in relation to the source $L_1$, a ring of eight spherical mirrors $M_1 \ldots M_8$ centered on the said source and also catching a total of about 25% of the flux emitted, a ring of eight objective lenses $O_1 \ldots O_8$ and a ring of eight plane mirrors $M'_1 \ldots M'_8$ suitably inclined and placed between the condensers and the said objective lenses in such a way that the eight elementary pencils coincide on the surface S being irradiated. In order to make FIGURE 2 easier to read, only the first and fifth elementary systems of the said condenser device are shown. This condenser device ensures that the irradiated surface is uniformly illuminated as the condensers $C_1 \ldots C_8$ have narrow aperture angles and because the irradiation of surface S is obtained by the coincidence of a number of elementary irradiations which are themselves uniform. Also, the said condenser device catches a large proportion of the flux emitted by the source, equal to the sum of the elementary fluxes caught by each elementary system.

In the form of embodiment of the invention shown in FIGURE 3, a certain number of condenser devices with single sources, of the type shown in FIGURE 2 previously described, have been associated to form a condenser device having several sources, in this case with three sources $L_2$, $L_3$, $L_4$, from which all the elementary pencils converge on center A of the surface to be irradiated S, which is thus uniformly lighted. Use of this device is especially advantageous in cases where the intensity of radiation required is high, where there are large surfaces to be irradiated or a well defined spectral distribution is to be effected.

In the form of embodiment of the invention shown in FIGURE 4, the improved condenser device with several sources, in this case the three sources $L_5$, $L_6$, $L_7$, with images of the condenser lenses of the various elementary systems, through the said systems, coinciding exactly on a surface $S_1$, comprises a lens $N_1$ placed on the said image of the condenser lenses and of the same dimensions as said image, a lens $N_2$ placed on the images of the source of the said elementary systems through the lens $N_1$, and a surface to be irradiated $S_2$ on which the objective lens $N_2$ forms the image of the lens $N_1$, the said objective lens allowing the radiating flux to pass through a small dimensional section, especially in dealing with problems of spatial simulation where the surface to be irradiated is placed in a vacuum chamber, allowing passage of the flux through the ports of the said vacuum chamber.

The improved condenser devices which are the subject of the present invention, particularly in the embodiment shown in FIGURES 2, 3 and 4 and described hereinabove, allow the spectral composition of certain elementary fluxes to be modified by adding suitable filters F. This enables the radiation to be filtered in a very flexible manner especially as it is possible to place on certain of the elementary pencils filters with a different spectral distribution which could not be used on a single pencil owing to their properties sometimes being in opposition. More particularly in problems of spatial simulation where it is necessary to obtain a uniformly illuminated surface with a radiation having a well-defined spectral composition, the use of xenon lamps makes it necessary to filter the over-abundant radiation in the near infrared and efficient filters are too opaque to ultraviolet radiation to be used on the entire pencil, so that the use of said improved condenser devices is particularly advantageous. Moreover, the improved condenser devices which are the subject of the present invention, and in particular in the embodiment shown in FIGURES 3 and 4 such as described hereinbefore may have sources of radiation of different natures so that by combining selected sources and partial filters F it is possible to obtain with the greatest possible accuracy a flux having a well-defined spectral distribution after recomposing all the elementary pencils, thus making use of the said improved condenser devices particularly suitable in the case of problems of spatial simulation.

In the forms of embodiment of the invention shown in FIGURES 2, 3 and 4 and described hereinabove, the fact that the condenser lenses of various elementary systems form their images through the said systems onto the surface to be irradiated, allows neutral filters F having a density which is variable in accordance with variable laws, to be placed in certain planes adjacent to the said condenser lenses so that by absorbing or reflecting the excess radiation in the corresponding areas of the useful surface the irradiation of the surface can be made as perfectly uniform as may be desired.

The present invention is not limited to the forms of embodiment which have been described and illustrated, and it can be modified without departing from the scope of the invention. In particular, the number of elementary optical systems as well as the number of sources of light may be different, the choice of characteristics of the lenses and mirrors may be different, the various condenser lenses and objective lenses and mirrors may be replaced by equivalent optical systems. Instead of placing the plane mirrors of the elementary systems between the condenser and the objective they may be placed between the objective and the surface being irradiated, and for practical reasons it is not necessary that the various condensers and objective lenses used be perpendicular to the optical axes of the various elementary systems.

I claim:
1. A radiation condenser device for irradiating a surface comprising
   a source of light;
   a plurality of elementary condenser systems of small aperture having a uniform degree of illumination and each generally comprising
      a condenser lens located in the path of the light from said source of light,
      a spherical mirror centered on said light source and placed so as to utilize part of the flux directed from said source away from the surface to be irradiated,
      and an objective lens in the path of light and located in the immediate vicinity of an image of said source formed through said condenser lens;
   each of said objective lenses located to form an image of its associated condenser lens on the surface to be irradiated;
   and all of these images coinciding so that the surface being irradiated is uniformly lighted.

2. A condenser device in accordance with claim 1 further including
   planar mirrors placed in the path of light of each of said elementary systems between said condenser lens and said objective lens.

3. A condenser device in accordance with claim 1 wherein
   said plurality of elementary systems are spaced around an axis extending between said light source and the center portion of the surface to be irradiated.

4. A condenser device in accordance with claim 1 in which filters for correcting spectral distribution are placed in the light path of certain of said elementary systems.

5. A condenser device in accordance with claim 4 in which the corrector filters for uniformity are placed in planes adjacent to certain of the said condenser lenses of the said elementary systems.

6. A condenser device in accordance with claim 1 in which several of the said condenser devices, each comprising a source of light, are grouped together for irradiating the same said surface.

7. A condenser device in accordance with claim 6 in which the sources of light of the various elementary systems are of a different nature.

8. A condenser device in accordance with claim 6 in which filters for correcting spectral distribution are placed in the path of certain of the pencils of the said elementary systems.

9. A condenser device in accordance with claim 6 in which uniformity corrector filters are placed in planes adjacent to certain of the said condenser lenses of the said elementary systems.

10. A radiation condenser device in accordance with claim 6 in which a lens is placed on the image of the condenser lenses given by the elementary systems and of the same dimensions, and an objective lens placed on the images of the source through the said elementary systems and through the said first lens, the said objective lens allowing the radiating flux to pass through a wall of reduced section and the formation of an image of the said first lens on the surface to be irradiated.

References Cited

UNITED STATES PATENTS

| | | | |
|---|---|---|---|
| 2,055,217 | 9/1936 | Gauthier | 240—41.3 |
| 2,134,551 | 10/1938 | Enfield | 240—41.35 |
| 2,215,203 | 9/1940 | Young | 240—41.3 |
| 2,552,185 | 5/1951 | Koch | 240—41.35 |
| 2,787,701 | 4/1957 | Rosin | 240—41.35 |
| 3,078,760 | 2/1963 | Brownscombe | 240—41.35 |
| 3,247,367 | 4/1966 | Rayces | 240—41.3 |

NORTON ANSHER, *Primary Examiner.*

WINDHAM, M. FRYE, RICHARD M. SHEER,
*Assistant Examiners.*